May 1, 1928.                          1,668,379
C. RADVANYI
COMBINED CREEPER AND STOOL
Filed Sept. 17, 1927        2 Sheets-Sheet 1
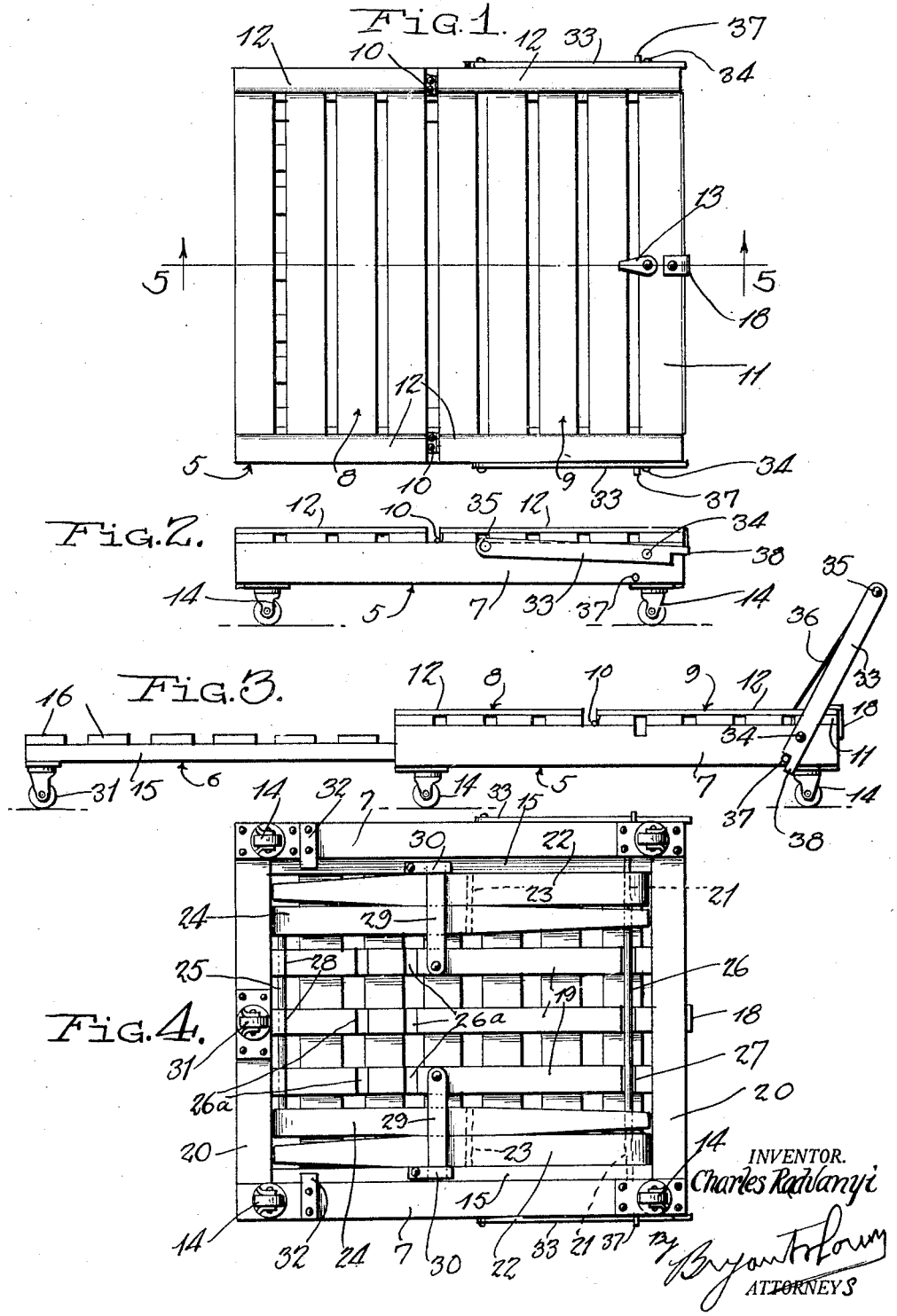

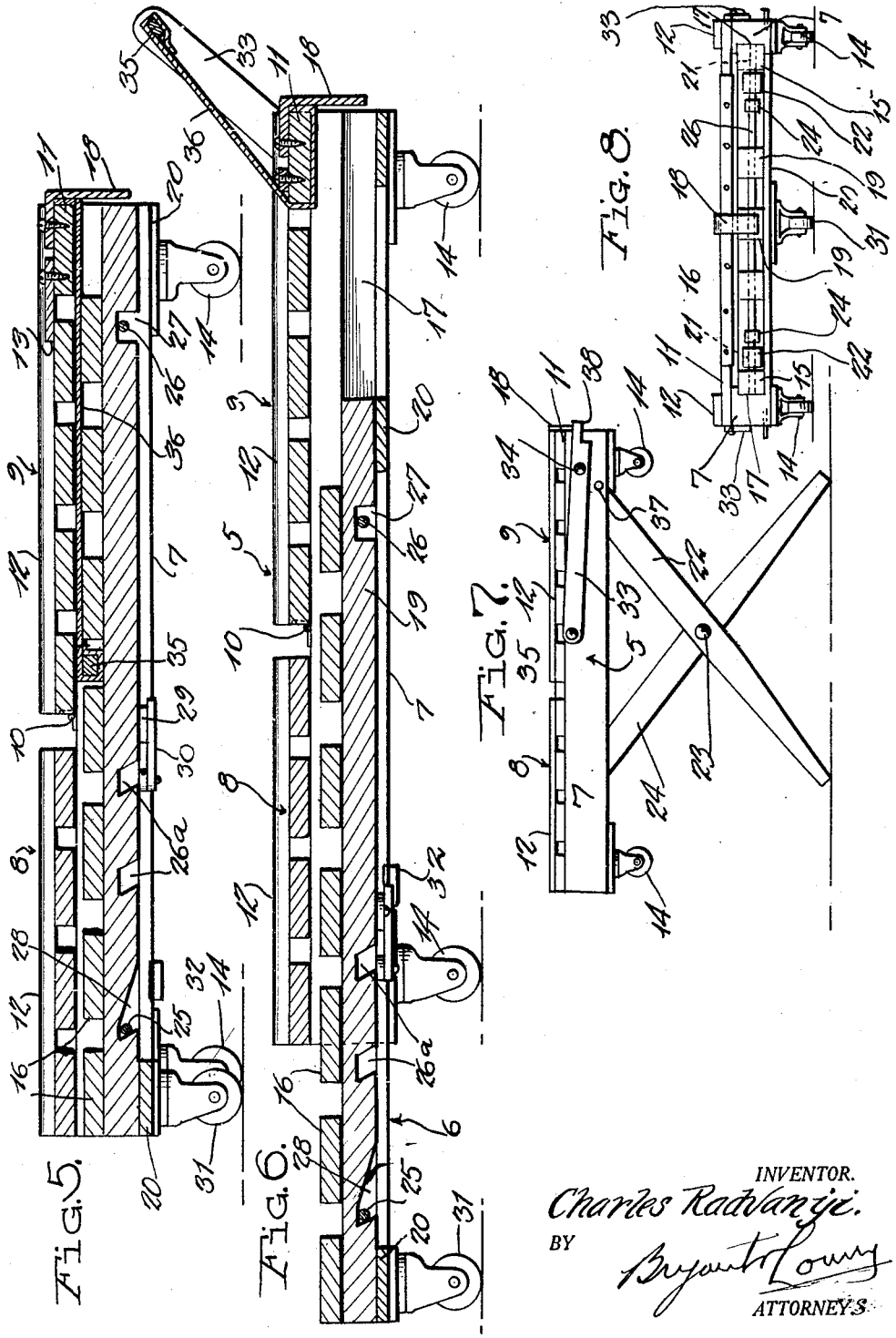

Patented May 1, 1928.

1,668,379

UNITED STATES PATENT OFFICE.

CHARLES RADVANYI, OF BRIDGEPORT, CONNECTICUT.

COMBINED CREEPER AND STOOL.

Application filed September 17, 1927. Serial No. 220,266.

This invention relates to a combined creeper and stool for use by automobile repair men.

The primary object of the invention is to provide a device of the above kind embodying a shiftable sectional supporting platform, the sections of which are adapted to be extended or collapsed, one of the sections being further provided with folding pivoted legs, whereby the structure may be selectively adjusted to form a creeper adapted to be moved about underneath a motor vehicle or to form a stool for the workman when not engaged in work beneath the vehicle.

An important object of the invention is to provide a device of the above kind which is extremely simple and durable in construction as well as highly serviceable in use.

A still further object is to provide a device of the above kind which may be readily collapsed into compact form for requiring a minimum amount of space when not in use, efficient means being provided for retaining the parts in collapsed relation.

Still another object is to provide a simple and desirable form of head rest for use when the device is in creeper form, the head rest being foldable out of the way when not for use, and means being provided to retain the head rest in folded position.

Another object is to provide a construction of the above kind in which the folded head rest is adapted to engage the extensible section of the platform to retain the latter in collapsed position.

Other objects will become apparent as the nature of the invention is better understood and the same consists in the novel form, combination, and arrangement of parts hereinafter more fully described, shown in the accompanying drawings, and claimed.

In the drawings, wherein like reference characters indicate corresponding parts throughout the several views, Figure 1 is a top plan view of a combined creeper and stool constructed in accordance with the present invention, the device being in collapsed condition, Figure 2 is a side elevational view of the device shown in Figure 1, Figure 3 is a view similar to Figure 2 showing the device in extended condition to form a creeper, Figure 4 is a bottom plan view of the device shown in Figure 2, Figure 5 is an enlarged longitudinal section taken upon line 5—5 of Figure 1, Figure 6 is a view similar to Figure 5 with the platform partly extended and the head rest operatively disposed, Figure 7 is a side elevational view of the device adjusted to form a stool, and Figure 8 is an end elevational view looking towards the left in Figure 1.

Referring more in detail to the drawings, the present invention includes a collapsible platform embodying a main section 5 and an auxiliary section 6 slidably and telescopically associated with the section 5 so as to be shiftable longitudinally of the latter in extended or collapsed position. The main platform section 5 embodies a pair of spaced parallel side rails 7 and a slatted floor or top wall including a fixed foot section 8 rigidly connecting the foot ends of the rails 7, a vertically swinging head section 9 hinged as at 10 at its rear end to the rails 7, and a transverse slat or bar 11 rigidly connecting the head ends of the rails 7. The top wall or floor sections embody transverse slats connected at their ends by longitudinal strips 12, and these strips 12 of the hinged section 9 are adapted to extend across and rest upon the slat 11, while the latter carries a pivoted catch 13 adapted to be swung to a position for overlying the slat at the free end of the hinged section 9 to hold the latter in lowered operative position. The main platform section 5 is provided at its corners with swiveled casters 14 which promote the ease of movement of the device over the ground or floor and which are mounted upon the ends of the side rails 7.

The auxiliary or supplemental platform section 6 embodies a pair of spaced parallel side rails 15 rigidly connected by cross slats 16 to form a top wall or floor, the rails 15 being slidably guided in longitudinal grooves 17 provided in the inner sides of the rails 7. The platform sections are of substantially equal length, and the movement of the supplemental section 6 to collapsed position is limited by means of a suitable stop carried by the head end of the main section 5 and preferably embodying an angle bracket 18 having a horizontal leg attached to the slat 11 and a vertical depending leg arranged to be abutted by the intermediate one of a plurality of spaced parallel longitudinal bars 19 arranged in spaced relation to and between the side rails 15 and rigidly secured at their ends upon transverse slats 20 fixed to the under side of the ends of the side rails 15, the bars 19 extending beneath the transverse slats 16 as clearly shown in several of the views.

Arranged parallel with and at the inner sides of the rails 15 as well as pivoted at adjacent ends to the head ends of said rails 15 as at 21, are a pair of supporting legs 22. Pivoted intermediate their ends as at 23 to the intermediate portions of the legs 22 and arranged at the inner sides of the latter is a further pair of legs 24, the adjacent ends of which are respectively rigidly connected by transverse rods 25 and 26. Thus, with the platform collapsed, the legs may be extended in crossed relation as shown in Figure 7 to form a stool, the upper ends of the legs 24 being held against movement relative to the legs 22 at said time by engagement of the cross bar 26 in transversely alined transverse grooves 26ª provided in the under sides of the longitudinal bars 19. As shown, two sets of the grooves 26ª are provided for selective reception of the rod 25 whereby the height of the stool may be adjusted in an obvious manner. Further transverse grooves 27 and 28 are provided in the under sides of the bars 19 at the ends of the latter for receiving the rods 25 and 26 when the legs are in collapsed condition flatly disposed at the under sides of the slats 16 and at the inner sides of the rails 15. The grooves 28 are preferably undercut as clearly shown in Figures 4, 5, and 6, and in order to hold the legs in collapsed position, suitable catches 29 are pivoted to the under side of the outer ones of the bars 19 and are engageable under keeper plates 30 fastened to the under side of the rails 15.

Mounted on the under side of the transverse slats 20 at the foot end of the platform section 6 intermediate the sides of the latter, is a swiveled caster 31 which promotes ease of movement of the section 6 with the section 5 over the floor, as well as ease of movement of the section 6 to and from collapsed position. Suitable inwardly projecting stop members 32 are fixed to the under side of the side rails 7 near the foot ends of the latter, so that the inwardly projecting ends of these stop members 32 are arranged in the path of the transverse slat 20 at the head end of the auxiliary or foot section 6 of the platform, whereby the movement of the section 6 to extended position is properly limited.

The device further embodies a foldable head rest including a pair of arms or posts 33 pivoted at corresponding ends as at 34 to the outer sides of the rails 7 near the head end of the latter and having their other free ends rigidly connected by a cross bar 35. Attached to the cross slat 11 at one end is a fabric sheet 36 whose other end is attached to the bar 35 so that when the arms 33 are swung to a rearwardly and upwardly inclined position, said sheet 36 will be placed in a taut condition to form a flexible or yielding support for the head of the person lying in a prone position upon the creeper. The arms 33 are adapted to be swung forwardly and downwardly to assume a position alongside the rails 7 and to position the cross bar 35 between a pair of the slats 16 when the platform is collapsed, thereby holding the platform section 6 from being extended unless the arms 33 are raised to disengage the bar 35 from between said slats 16. The downward movement of the arms 33 and passage of bar 35 and the sheet 36 beneath the hinged floor section 9 is permitted by swinging the latter upwardly on the hinges 10. When the head rest is thus folded it is neatly disposed out of the way, and with the catch 13 engaging the floor section 9, the bar 35 will be held between the adjacent pair of slats 16 to effectively prevent extension of the platform section 6. The upward swinging movement of the arms 33, to operatively position the head rest, may be properly limited by lateral pins 37 provided on the outer sides of the rails 7 and engageable by stop lugs 38 on the pivoted ends of the arms 33.

When it is desired to use the device as a creeper, the floor section 9 is raised so as to permit the head rest to be swung to operative position and at the same time release the foot section 6 of the platform. The foot section 6 is then withdrawn or extended, and with the floor section 9 again lowered and held by the catch 13, the device is ready for use. A reversal of this operation will collapse the device for requiring a minimum amount of space when not in use, and when so collapsed, the device may be converted into a stool by simply disengaging the catches 29 from the keeper plates 30 and withdrawing the legs 22 and 24 from the folded position between the rails 15 as shown in Figure 4 to the unfolded position of Figure 7, the rod 25 being engaged in the proper set of grooves 26ª in accordance with the height desired for the stool.

Minor changes may be made without departing from the spirit and scope of the invention as claimed.

What I claim as new is:

1. In an automobile repairman's creeper, a shiftable platform embodying a main section and an auxiliary section slidably telescopically associated with said main section for movement longitudinally of the latter to extended or collapsed position, said main section having a hinged floor section, and a head rest carried by said main section and foldable beneath said hinged floor section, said head rest embodying a member engageable with the auxiliary section to hold it in collapsed position.

2. In an automobile repairman's creeper, a shiftable platform embodying a main section and an auxiliary section slidably telescopically associated with said main section for movement longitudinally of the latter to extended or collapsed position, said main section having a hinged floor section, and a head rest carried by said main section and foldable beneath said hinged floor section, said head rest embodying a member engageable with the auxiliary section to hold it in collapsed position, and means to retain the hinged floor section in lowered position to secure the head rest in engagement with the auxiliary section.

In testimony whereof I affix my signature.

CHARLES RADVANYI.